US005129483A

United States Patent [19]

Nussbaum

[11] Patent Number: 5,129,483

[45] Date of Patent: Jul. 14, 1992

[54] HOIST FOR MOTOR VEHICLES

[75] Inventor: Hans Nussbaum, Kehl-Sundheim, Fed. Rep. of Germany

[73] Assignee: Otto Nussbaum GmbH & Co. KG, Kehl-Bodersweier, Fed. Rep. of Germany

[21] Appl. No.: 695,050

[22] Filed: May 2, 1991

[30] Foreign Application Priority Data

Jun. 12, 1990 [DE] Fed. Rep. of Germany ....... 4018726

[51] Int. Cl.[5] .............................................. B60S 13/00

[52] U.S. Cl. ................................. 187/8.41; 254/89 H

[58] Field of Search .................... 187/8.41, 8.62, 8.61, 187/9 R; 254/89 H, 89 R, , 93 R, 93 L, 4 B, 4 R, 2 R, 2 B

[56] References Cited

U.S. PATENT DOCUMENTS

| | | | |
|---|---|---|---|
| 1,886,253 | 11/1932 | Stukenborg | 254/28 |
| 3,489,248 | 1/1970 | Clarke | 182/8.41 |
| 4,134,475 | 1/1979 | Jones | 187/8.75 |
| 4,196,887 | 4/1980 | Tsujimura | 254/89 H |
| 4,892,028 | 1/1990 | Stivens | 254/89 H |

FOREIGN PATENT DOCUMENTS

| | | | |
|---|---|---|---|
| 1141428 | 9/1958 | Fed. Rep. of Germany . | |
| 1965909 | 12/1969 | Fed. Rep. of Germany . | |
| 2011084 | 3/1970 | Fed. Rep. of Germany . | |
| 2307711 | 2/1973 | Fed. Rep. of Germany . | |
| 145189 | 11/1980 | Fed. Rep. of Germany | 254/89 H |
| 3235829 | 3/1984 | Fed. Rep. of Germany | 254/89 H |

*Primary Examiner*—Robert P. Olszewski
*Assistant Examiner*—Kenneth Noland
*Attorney, Agent, or Firm*—Edwin E. Greigg; Ronald E. Greigg

[57] ABSTRACT

The invention relates to a hoist for motor vehicles, with at least two vertically displaceable columns having on their upper end a support surface for receiving the vehicle, where in a retracted state the columns are disposed below the ground in a pit and the support surface is located approximately at the level of a shop floor. In order to make do with a reduced depth of the pit while retaining the same lifting height of the columns, the columns comprise an interior, vertically displaceable lift element supporting a deflection roller for operation of a cable on its upper end. One end of the cable is attached fixed in place, while the other end of the cable is fastened to a support pipe with a support surface which is vertically displaceable in relation to the lift element, where a sleeve, displaceable in relation to the support pipe, is provided which acts as a telescopic guide when the column is extended.

19 Claims, 3 Drawing Sheets

HOIST FOR MOTOR VEHICLES

BACKGROUND OF THE INVENTION

The invention relates to a hoist for motor vehicles, in particular passengers cars, with at least two vertically displaceable columns having on their upper ends a support surface for receiving the vehicle, where, in the retracted state the columns are disposed below the ground in a pit and the support surfaces are located approximately at the level of the shop floor.

OBJECT AND SUMMARY OF THE INVENTION

Hoists of this type are known in various embodiments. Their advantage lies in that in the retracted state all parts of the hoist disappear in the shop floor. This improves the freedom of movement in the shop considerably more than with hoists which are above ground and whose columns are in the way, even if the hoist is not used.

On the other hand, it is necessary to dig pits for hoists installed in the shop floor, which must have a depth approximately corresponding to the height of the raised hoist. In practice it is necessary to dig pits having a depth of approximately 2 m.

It is an object of the present invention to improve a hoist of the previously described species which can be installed in the shop floor in such a way, that a lesser depth of the pit suffices while the raised height remains the same. Furthermore, the hoist in accordance with the invention is intended to be distinguished by rugged and cost-efficient construction.

This object is attained in accordance with the invention in that the columns each have the following structure:

a. an internal, vertically displaceable lift element, which at its upper end has a deflection roller for an at least partially flexible traction means of which one end is mounted fixed in place, b. a support pipe, vertically displaceable in relation to the lift element, which bears the support surface on the upper end and is connected with the lower end of the traction means on the bottom, c. a sleeve, displaceable in relation to the support pipe, which acts as a telescopic guidance for the support pipe when the column is being extended.

When rising, the lift element creates in a manner known per se twice as large a lift travel of the support pipe because of the connection of the support pipe with the traction means, which in turn runs over a deflection roller of the lifting element. At the same time the displaceable sleeve continuously displaces the guidance of the support pipe upwards, so that the support pipe is stabilized crosswise, even in the extended state. Thus the invention essentially comprises a combination of increased lift with telescopic guidance.

The displaceable sleeve acting as telescopic guidance for the support pipe is disposed outside of the latter. Practically it surrounds the support pipe on its outside and is itself guided in a guide bushing cut into the shop floor.

Displacement of the sleeve, whose lift corresponds to approximately half the lift of the support pipe, may be created by the support pipe, perhaps in such a way, that the support pipe, after reaching half its lift travel, comes into contact with the sleeve by means of a stop and takes it along over the remaining lift distance. However, it is particularly advantageous if the sleeve is rigidly connected with the lift element and makes the lifting movements synchronously with it.

Theoretically the hoist may have four columns, which are connected in pairs by means of the support rails for the vehicle. However, in practice it is sufficient to provide only two columns, one on each side of the vehicle. In this case it is particularly advantageous if twist prevention means are disposed between the support pipe and the lift element. For this purpose, the support pipe may have near its lower end a guide plate surrounding the lift element, whose central opening corresponds to the exterior shape of the lifting element.

So that both columns perform the lift movement synchronously, it is recommended to connect both columns with each other with a cross yoke which is fixed with its ends to the two lift element and/or the two sleeves.

Introduction of the lift force to the columns takes place either directly at the lift elements or via the common cross yoke. In the first mentioned case the lift elements may be parts of a hydraulically operable cylinder-piston arrangement. In the second case the cross yoke may be driven by lifting spindles or a scissors device.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
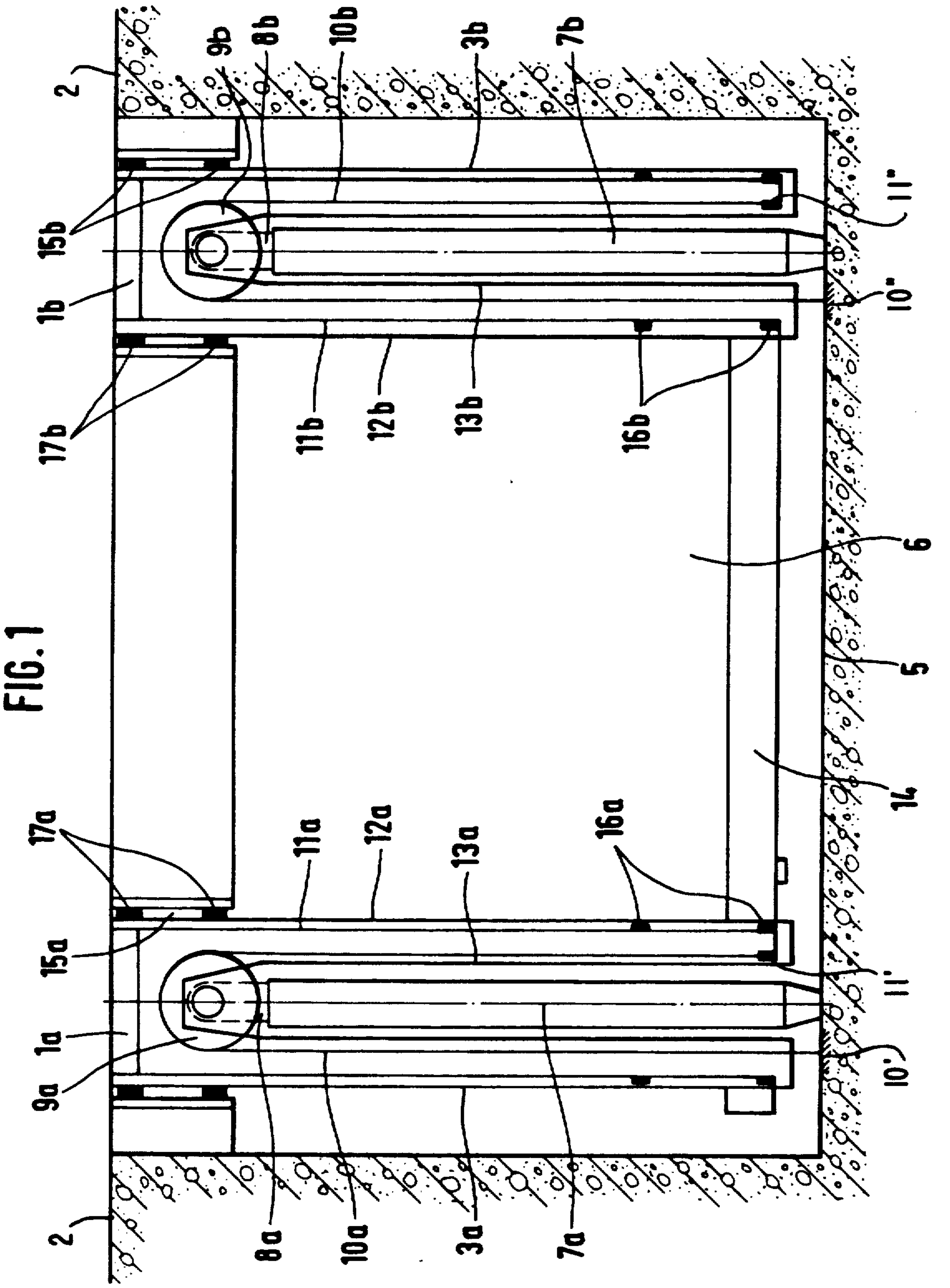
FIG. 1 is a schematic view of the principle of the hoist.

In the view of the principle of the invention in FIG. 1, the hoist is in the lowered position. The two support surfaces 1*a* and 1*b* used to receive the vehicle, are on the same level as the shop floor 2. Its two columns have been generally designated by 3*a* and 3*b* and rest on a foundation 5 of a pit 6.

The structure of the columns is as follows: a lift element 7*a* or 7*b* in the form of a cylinder-piston arrangement is located in their center, whose piston rods 8*a* or 8*b* support on their upper end a deflection roller 9*a* or 9*b* and which can be displaced hydraulically upward together with the piston rods.

Traction means 10*a* or 10*b* in the shape of a chain or a cable runs over the deflection roller. This traction means is fixed in place with its one end 10', 10" for example at the foundation or at the cylinder of the lift element *7a, 7b*. The opposite, other end is connected with the lower area of a support pipe 11*a* or 11*b* at 11', 11". The previously mentioned support surface 1*a* or 1*b* is mounted on this support pipe.

So that the traction means does not act on only one side of the support pipe, a second traction means is disposed parallel to and at a short distance from it and with its own deflection roller at each column, and this traction means acts on the side opposite from the first traction means.

It is essential that during the lifting movement the support pipe 11*a* or 11*b* is supported in the crosswise direction by a sleeve 12a or 12 b, also displaceable, so that this sleeve acts as a telescopic guidance for the support pipe.

The sleeve 12a, 12b is connected directly or indirectly by a cross piece 20 with the upwardly moving part of the lift element, in this case with the piston 8a or 8b. In the exemplary embodiment, the piston rod 8a or 8b has a downwardly drawn extension 13a or 13b for this purpose, which is connected with the sleeve 12a or 12b near the lower end of the support pipe 11a, in the exemplary embodiment by means of a cross yoke 14, that synchronizes the two lift pistons 8a or 8b and the sleeves 12a or 12b connected to the yoke.

The two sleeves 12a, 12b each run with their upper ends in a guide bushing 15a or 15b, which is inserted into the shop floor. The length of the sleeves approximately corresponds to the displacement travel of the piston rods 8a or 8b and thus to approximately one-half the lift of the support pipes 11a and 11b.

The mods of operation is as follows: When the lift elements 7a and 7b are charged with hydraulic oil, the piston rods 8a and 8b move upward as do, at the same time, the two elements 12a and 12b. Simultaneously the support pipes 11a and 11b are lifted, but at twice the lifting speed, by the traction means 10a and 10b, running over the deflection rollers. By means of the sleeves 12a and 12b, which follow them sleeves 11a and 11b at one-half the speed, the guidance for the support pipes is upwardly displaced, i.e. the support pipe is braced by the sleeve 12a, 12b at about one-half the level of the extended lift travel.

It is practical to provide guide rings 16a or 16b between the support pipe 11a or 11b and its sleeve 12a and 12b, and this is the form of two rings disposed above one another at a distance. Because of this, play between these two parts caused by tilting is prevented. These guide rings may be placed at the lower end of the support pipe or at the upper end of the sleeve.

Pairs of sealing rings 17a or 17b between the sleeve and its guide bushing 15a or 15b are used for the same purpose.

Further characteristics of the structure ensue from the subsequent drawing figures.

Figure 2:
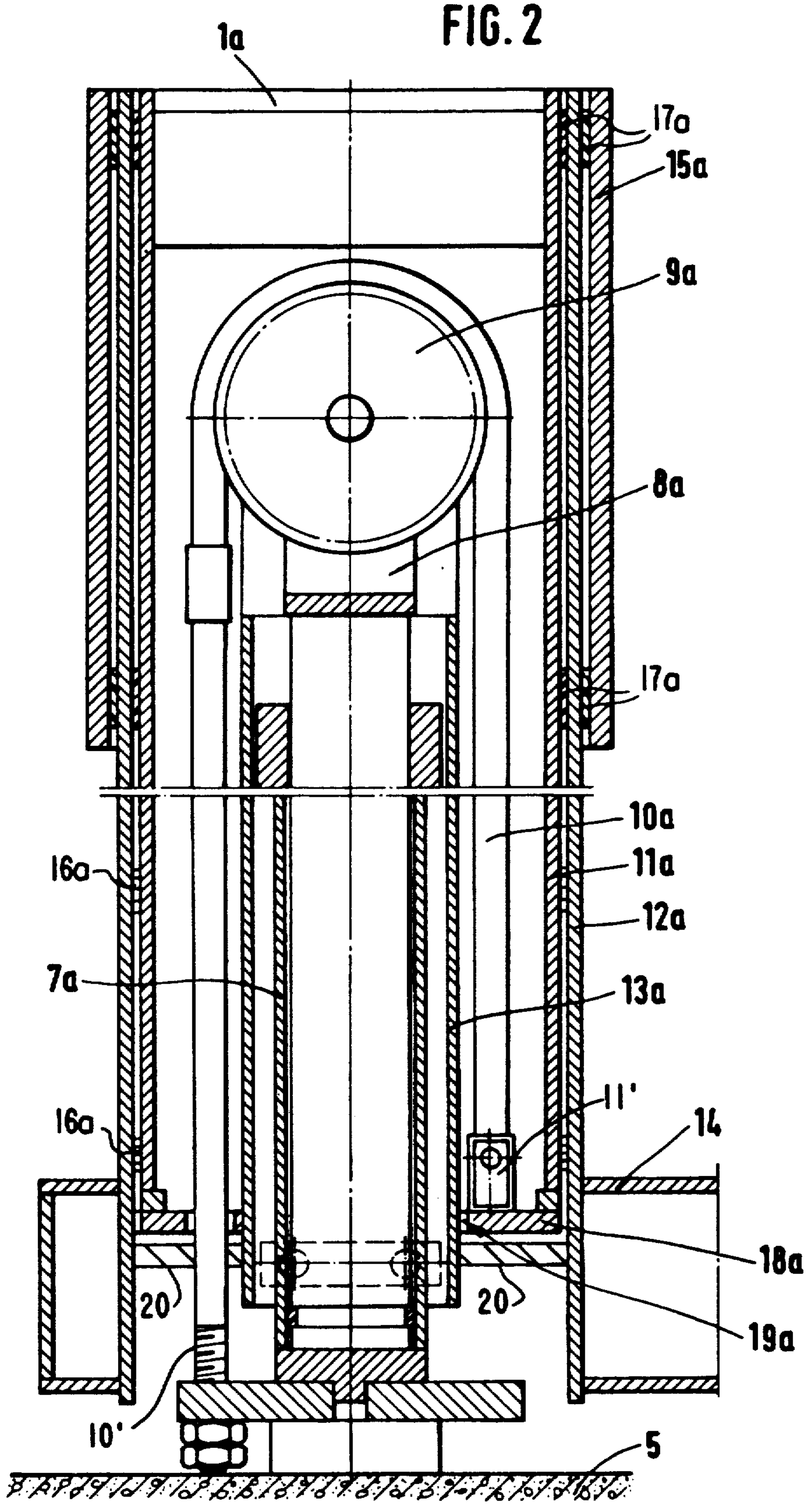
FIG. 2 is an enlarged longitudinal section of a column.

Twist prevention in the form of a plate 18a, forming the lower closure of the support pipe 11a, on which the traction means 10a is anchored and which has an opening 19a of rectangular cross section on the inside, which corresponds to the downwardly drawn shape of the extension 13a of the piston rod 8a can be particularly seen in FIG. 2.

Figure 3:
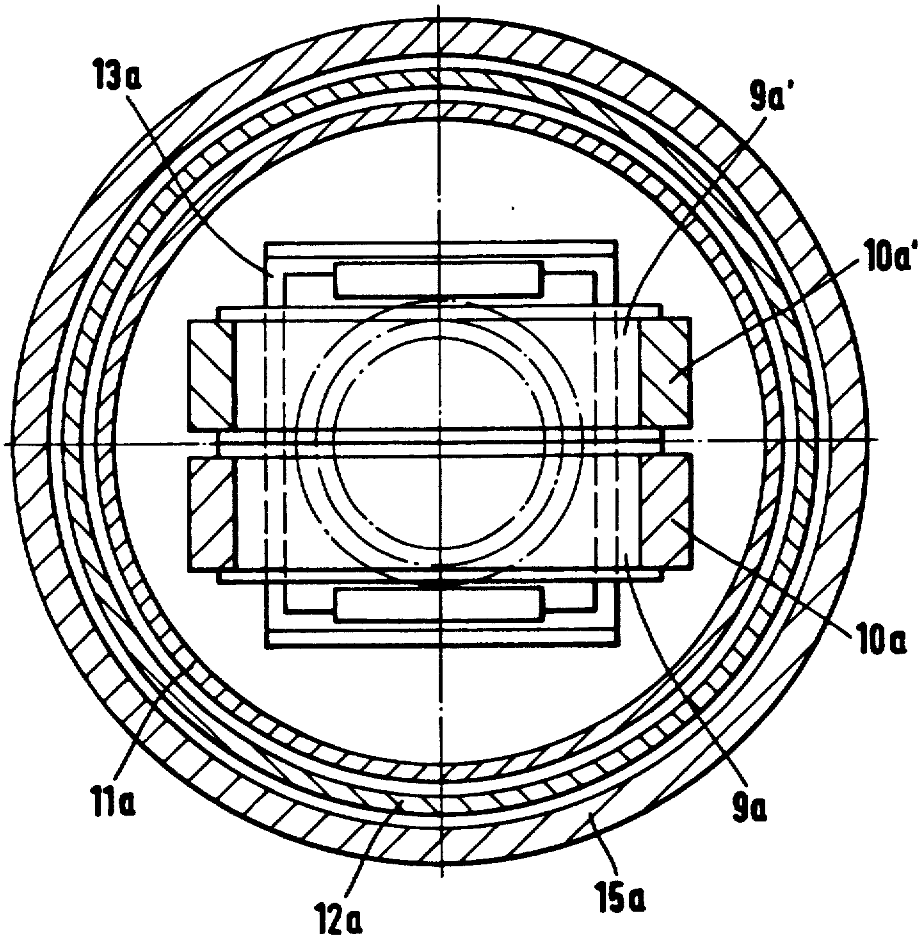
FIG. 3 is a cross section of FIG. 2.

FIG. 3 is a cross section at the level of the deflection rollers. Here it can be seen that two adjacently disposed deflection rollers 9a and 9a' are disposed in each column, to each of which a separate traction means 10a or 10a is assigned. These traction means operate in directions opposite to each other, so that their ends performing the lifting movements act on approximately opposite areas of the support pipe 11a.

In conclusion, the above described invention is distinguished by its low installation depth without limitation to the lifting height and by the exact guidance of the support pipes in their extended position.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the U.S. is:

1. A hoist for motor vehicles, in which the hoist is disposed below a level of a surrounding surface at its upper end, said hoist including at least two vertically displaceable columns having upper and lower ends, a support surface on their upper ends for receiving the vehicle, on a support surface located approximately at a level of the surrounding surface, each of the two columns having the following structure:

an internal, vertically displaceable lift element (7a, 7b, 8a, 8b), at the upper end of the said lift element, a deflection roller (9a, 9b), a flexible traction means (10a, 10b) in combination with said flexible traction means, one end of said flexible traction means mounted fixed in place on a support means, a support pipe (11a, 11b), vertically displaceable in relation to the lift element (7a,7b, 8a, 8b), which bears the support surface (1a, 1b) on its upper end and to which the other end of the traction means (10a, 10b) is connected to the bottom thereof, a sleeve (12a, 12b), displaceable in relation to the support pipe (11a, 11b) which acts as a telescopic guidance for the support pipe (11a, 11b) when the column is being extended, and said sleeve (12a, 12b) functions as a telescopic guide and encloses the support pipe (11a, 11b) on its outside and that the sleeve (12a, 12b) is guided in a guide bushing (15a, 15b) at a height juxtaposed the surrounding surface (2).

2. A hoist in accordance with claim 1, in which the sleeve (12a, 12b) is rigidly connected with the lift element (8a, 8b).

3. A hoist in accordance with claim 2, in which only one column (3a, 3b) is assigned to two sides of the vehicle, in which, a twist prevention element (18a) is disposed between the support pipe (11a, 11b) and the lift element (7a, 7b, 8a, 8b).

4. A hoist in accordance with claim 2, in which two traction means (10a, 10b) are built into each column (3a, 3b) which engage the support pipe (11a, 11b) at points approximately opposite each other.

5. A hoist in accordance with claim 1, in which the sleeve (12a, 12b) is rigidly connected with the lift element (8a, 8b).

6. A hoist in accordance with claim 5, in which only one column (3a, 3b) is assigned to two sides of the vehicle, in which, a twist prevention element (18a) is disposed between the support pipe (11a, 11b) and the lift element (7a, 7b, 8a, 8b).

7. A hoist in accordance with claim 5, in which two traction means (10a, 10b) are built into each column (3a, 3b), which engage the support pipe (11a, 11b) at points approximately opposite each other.

8. A hoist in accordance with claim 1, in which only one column (3a, 3b) is assigned to two sides of the vehicle, in which, a twist prevention element (18a) is disposed between the support pipe (11a, 11b) and the lift element (7a, 7b,8a, 8b).

9. A hoist in accordance with claim 1, in which two traction means (10a, 10b) are built into each column (3a, 3b), which engage the support pipe (11a, 11b) at points approximately opposite each other.

10. A hoist in accordance with claim 1, in which both columns (3a, 3b) are connected with each other to synchronize their lift motion.

11. A hoist in accordance with claim 10, in which the connection is made by means of a cross yoke (14), which is rigidly connected with the two lift elements (8*a* , 8*b*).

12. A hoist in accordance with claim 11, in which the two lift elements (8*a*, 8*b*) as well as the two sleeves (12*a*, 12*b*) are fixedly attached to the cross yoke (14).

13. A hoist in accordance with claim 11, in which the introduction of the a lift force takes place at the cross yoke (14).

14. A hoist in accordance with claim 12, in which the introduction of the a lift force takes place at the cross yoke (14).

15. A hoist in accordance with claim 1, in which the lift element (7*a*, 7*b*, 8*a*,8*b*) is a hydraulically operable cylinder-piston arrangement with an upwardly displaceable piston rod (8*a*, 8*b*).

16. A hoist in accordance with claim 1, in which the lift element is a hydraulic cylinder-piston arrangement, whose cylinder is upwardly displaceable while the piston rod is supported on a foundation.

17. A hoist for motor vehicles, in which the hoist is disposed below a level of a surrounding surface at its upper end, said hoist including at least two vertically displaceable columns having upper and lower ends, a support surface on their upper ends for receiving the vehicle, on a support surface located approximately at a level of the surrounding surface, each of the two columns having the following structure:

an internal, vertically displaceable lift element (7*a*, 7*b*, 8*a*, 8*b*), at the upper end of said lift element, a deflection roller (9*a*, 9*b*), a flexible traction means (10*a*, 10*b*) in combination with said flexible traction means, one end of said flexible traction means mounted fixed in place on a support means, a support pipe (11*a*, 11*b*), vertically displaceable in relation to the lift element (7*a*, 7*b*, 8*a*, 8*b*), which bears the support surface (1*a*, 1*b*) on its upper end and to which the other end of the traction means (10*a*, 10*b*) is connected to the bottom thereof, a sleeve (12*a*, 12*b*) displaceable in relation to the support pipe (11*a*, 11*b*), which acts as a telescopic guidance for the support pipe (11*a*, 11*b*) when the column is being extended, and only one column (3*a*, 3*b*) is assigned to two sides of the vehicle, in which a twist preventing element (18*a*) is disposed between the support pipe (11*a*, 11*b*) and the lift element (7*a*, 7*b*, 8*a*, 8*b*).

18. A hoist in accordance with claim 17, in which two traction means (10*a*, 10*b*) are built into each column (3*a*, 3*b*), which engage the support pipe (11*a*, 11*b*) at points approximately opposite each other.

19. A hoist for motor vehicles, in which the hoist is disposed below a level of a surrounding surface at its upper end, said hoist including at least two vertically displaceable columns having upper and lower ends, a support surface on their upper ends for receiving the vehicle, on a support surface located approximately at a level of the surrounding surface, each of the two columns having the following structure:

an internal, vertically displaceable lift element (7*a*, 7*b*, 8*a*, 8*b*), at the upper end of said lift element, a deflection roller (9*a*, 9*b*), a flexible traction means (10*a*, 10*b*), in combination with said flexible traction means, one end of said flexible traction means mounted fixed in place on a support means, a support pipe (11*a*, 11*b*), vertically displaceable in relation to the lift element (7*a*, 7pi b, 8*a*, 8*b*), which bears the support surface (1*a*, 1*b*) on its upper end and to which the other end of the traction means (10*a*, 10*b*) is connected to the bottom thereof, a sleeve (12*a*, 12*b*), displaceable in relation to the support pipe (11*a*, 11*b*), which acts as a telescopic guidance for the support pipe (11*a*, 11*b*) when the column is being extended, two traction means (10*a*, 10*b*) are built into each column (3*a*, 3*b*), which engage the support pipe (11*a*, 11*b*) at points approximately opposite each other, and the support pipe (11*a*, 11*b*) has near its lower end a guide plate (18*a*) surrounding the lift element (7*a*, 7*b*, 8*a*, 8*b*) and acting as a twist prevention element.

* * * * *